United States Patent
Hupp et al.

(10) Patent No.: US 11,761,893 B2
(45) Date of Patent: Sep. 19, 2023

(54) WATER VAPOR DIFFERENTIAL MINIMIZATION SYSTEMS AND METHODS FOR GAS EXCHANGE MEASUREMENTS OF AQUEOUS OR WATER SATURATED SAMPLES

(71) Applicant: LI-COR, Inc., Lincoln, NE (US)

(72) Inventors: Jason Hupp, Lincoln, NE (US); Mark Johnson, Lincoln, NE (US); Bob Eckles, Lincoln, NE (US); Douglas Lynch, Lincoln, NE (US)

(73) Assignee: LI-COR, Inc., Lincoln, NE (US)

( * ) Notice: Subject to any disclaimer, the term of this patent is extended or adjusted under 35 U.S.C. 154(b) by 544 days.

(21) Appl. No.: 17/107,287

(22) Filed: Nov. 30, 2020

(65) Prior Publication Data
US 2021/0223173 A1  Jul. 22, 2021

Related U.S. Application Data

(60) Provisional application No. 62/963,950, filed on Jan. 21, 2020.

(51) Int. Cl.
*G01N 21/61* (2006.01)
(52) U.S. Cl.
CPC ..................... *G01N 21/61* (2013.01)
(58) Field of Classification Search
CPC ..................................................... G01N 21/61
See application file for complete search history.

(56) References Cited

U.S. PATENT DOCUMENTS

2012/0073355 A1   3/2012 Johnson et al.
2020/0408729 A1  12/2020 Welles et al.

OTHER PUBLICATIONS

Ren et al., "Carbon Dioxide Transport in Nafion 1100 EW Membrane and in a Direct Methanol Fuel Cell," Journal of The Electrochemical Society, 162 (10) F1221-F1230, Aug. 10, 2015.
"Nafion Ion Exchange Materials: Safety in Handling and Use," Technical Bulletin T-01, The Chemours Company FC, LLC, Fayetteville, NC, 2016.

*Primary Examiner* — Nicole M Ippolito
*Assistant Examiner* — Hanway Chang
(74) *Attorney, Agent, or Firm* — Gerald T. Gray; Leydig, Voit & Mayer, LTD.

(57) ABSTRACT

Systems and method for minimizing the impact of water vapor or other interferent analyte on analyte concentration measurements in a gas exchange measurement system. A system is includes a gas source, first and second gas analyzers coupled to first and second gas flow lines and configured to measure first and second concentrations of a target analyte in the first and second gas flow lines, respectively, a sample chamber configured to hold a water saturable sample, and a water vapor selective element and having a first and second inputs fluidly coupling the gas source to first and second sides, respectively, of the water vapor selective element, and at least one output fluidly coupling the first side of the water vapor selective element to the first and second gas flow lines and a second output coupling the second side of the water vapor selective element to the second gas flow line.

22 Claims, 8 Drawing Sheets

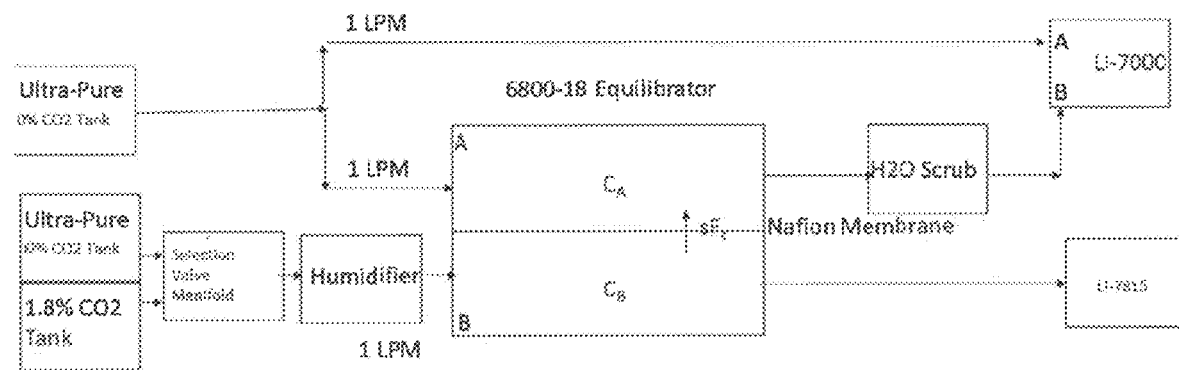
FIG. 6: Set up for the Experiment

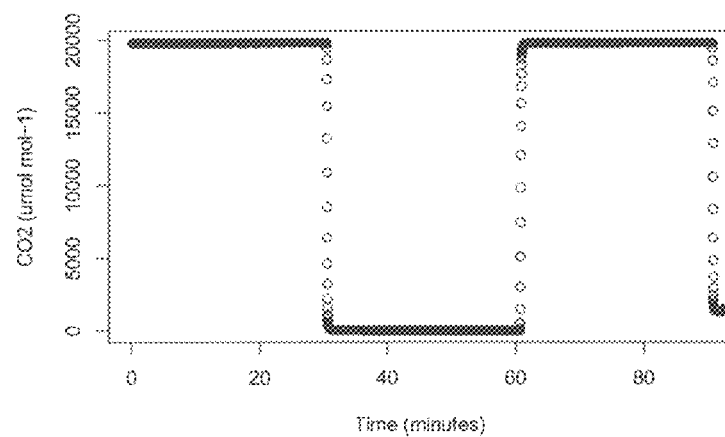
FIG. 7: LI-COR LI-7815: CO2 Data measuring Compartment B
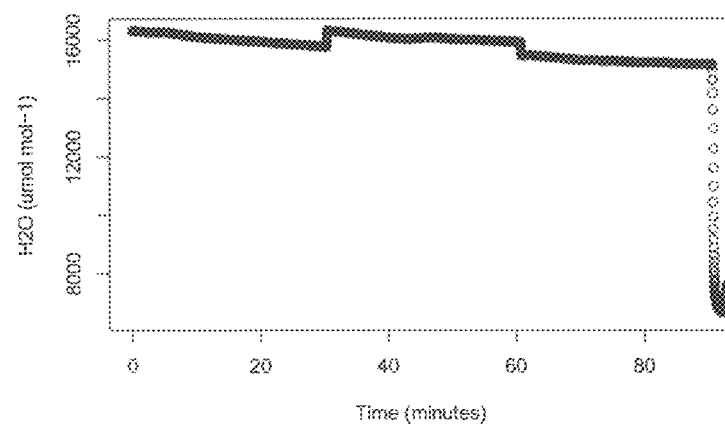
FIG. 8: LI-COR LI-7815: H2O Data measuring Compartment B

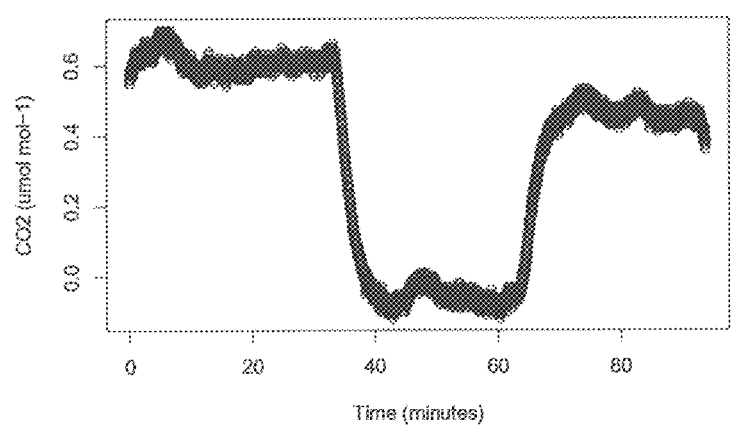
FIG. 9: LI-7000 CO2 Data measuring Compartment A

WATER VAPOR DIFFERENTIAL MINIMIZATION SYSTEMS AND METHODS FOR GAS EXCHANGE MEASUREMENTS OF AQUEOUS OR WATER SATURATED SAMPLES

CROSS-REFERENCE TO RELATED APPLICATION

This application claims the benefit of priority to U.S. Provisional Patent Application No. 62/963,950, filed Jan. 21, 2020, which is hereby incorporated by reference in its entirety.

BACKGROUND

Gas exchange measurement systems, such as systems for measuring plant photosynthesis and transpiration rates, can be categorized as open or closed systems. For open systems, a leaf or plant sample may be enclosed in a sample chamber, and an air stream is passed continuously through the chamber. $CO_2$ and $H_2O$ concentrations of chamber influent and effluent are measured, and the difference between influent and effluent concentration is calculated. (Throughout this document the term "concentration" refers to mole fraction of a gas in natural or synthetic moist air, or mole fraction in natural or synthetic dry air ("dry mole fraction") where such is specified.) This difference may be used, along with the mass flow rate, to calculate photosynthesis ($CO_2$) and transpiration ($H_2O$) rates. For closed systems, the leaf or plant is enclosed in a chamber that is not supplied with fresh air. The concentrations of $CO_2$ and $H_2O$ are continuously monitored within the chamber. The rate of change of this concentration, along with the chamber volume, may be used to calculate photosynthesis ($CO_2$) and transpiration ($H_2O$) rates.

In some photosynthesis systems, a conditioned air stream is typically split into two streams. The first flow path (known as reference) passes through a gas analyzer (e.g., Infra-Red Gas Analyzer or IRGA), which measures constituent gas concentrations (e.g. $CO_2$ and $H_2O$). The second flow path (known as sample) passes through a sample chamber (e.g. leaf chamber) in which gas exchange occurs. This second sample flow path exits the chamber and enters a second gas analyzer (e.g., IRGA) or alternates with the reference air stream through a single gas analyzer. The differences between the sample and reference gas analyte concentrations are used in calculating photosynthesis ($CO_2$) and transpiration ($H_2O$).

As photosynthesis and transpiration measurements are based on concentration differences in these two gas streams, the accuracy in measuring the difference is more important than measuring the absolute concentration of either. In an open flow through gas exchange system, the fluxes of a gaseous analyte are derived by mass balance between the air stream before (reference) and after (sample) interaction with a biological sample. The analyte concentration difference between the reference and sample air stream (i.e., differential) is computed from the difference of two concentrations measured by the pair of absolute gas analyzers (e.g., IRGAs), each with unique calibration and drift peculiarities. Because of the unique characteristics of a particular analyzer, a cross calibration (matching) is typically performed regularly during normal measurements to ensure that the analyte differentials are computed as accurately as possible from two absolute concentration measurements. Matching is done by passing a common air stream through both analyzers and adjusting their outputs to match the absolute concentrations of one gas analyzer to the other for each gaseous analyte measured.

For sample and reference air streams operating near the same water vapor concentration, matching provides a sufficient means of ensuring the analyte differential is accurately computed. Aspects regarding analyzer matching in the context of a gas exchange measurement system can be found in U.S. application Ser. No. 62/868,181, filed Jun. 28, 2019, and titled "Dynamic and Real-Time Correction of Differential Measurement Offsets in a Gas Analysis System," which is hereby incorporated by reference in its entirety.

However, where water vapor concentrations are quite different between the sample and reference air streams, as may be the case when measuring gas fluxes from an aqueous solution or water saturable sample, matching may not ensure analyte differentials are accurately computed from two absolute concentrations. Matching at one water vapor concentration and making measurements at another concentration introduces error in the differential computed from two absolute analyte concentration measurements that may be larger than the change in analyte concentration induced by the sample. In the case of Non-Dispersive Infrared (NDIR) based $CO_2/H_2O$ gas analyzers, the errors associated with matching at a water vapor concentration different than the operating condition may be attributed to the inherent cross sensitivity of the $CO_2$ measurement to $H_2O$ and the nonlinear nature of an analyzer's response to gas concentrations. The impact of these errors may be magnified in the final gas flux computations by the $H_2O$ dilution correction included in the flux computation.

Condensation in an open flow through gas exchange system is also problematic. Liquid water is potentially harmful to the components of the system and is a strong attenuator of infrared light, meaning that liquid water entering an IRGA may detrimentally impact the concentration measurements used to determine gaseous analyte exchange rates. Carbon dioxide is soluble in liquid water, unlike water vapor, thus the process of condensing or evaporating liquid water inside the gas exchange system causes an additional carbon dioxide flux separate from that generated by sample of interest. This flux causes a transient error in both the $CO_2$ measurement and the $H_2O$ measurement as the liquid water moves into equilibrium with the air in the system.

Thus, there is a need for improved gas analysis systems and methods for analyzing aqueous samples and water saturable samples.

SUMMARY

The present disclosure provides systems and method for reducing or minimizing the impact of water vapor on analyte concentration measurements in a gas exchange measurement system. More generally, the present disclosure provides systems and method for reducing or minimizing the impact one analyte (e.g., an interfering or "interferent" analyte) may have on a measurement of a target analyte in a differential measurement system.

The systems and methods provided herein offer at least the following two advantages in the context of measuring gas exchange from a water saturable (e.g., may become fully saturated) or aqueous sample in an open flow through gas exchange system: (1) to reduce the water vapor concentration of the sample air stream below the dewpoint, thereby reducing the potential for liquid condensation in downstream components, and (2) to minimize the water vapor differential between the sample and reference air streams, thereby reducing the error in the measurement of the target analyte concentration differential.

According to an embodiment, a gas analysis system is provided that typically includes a gas source configured to provide a flow of a gas, a first gas analyzer coupled to a first gas flow line and configured to measure a first concentration of a target analyte in the gas received from the first gas flow line, a second gas analyzer coupled to a second gas flow line and configured to measure a second concentration of the target analyte in the gas received from the second gas flow line, a sample chamber configured to hold a water saturable sample or aqueous sample, and a filter component including a water vapor selective element and having a first input fluidly coupling the gas source to a first side of the water vapor selective element, a second input fluidly coupling an output of the sample chamber to a second side of the water vapor selective element, and at least one output fluidly coupling the first side of the water vapor selective element to the first gas flow line and to the second gas flow line and a second output coupling the second side of the water vapor selective element to the second gas flow line.

In another embodiment, a gas analysis system is provided that includes a gas source configured to provide a flow of a gas, at least one gas analyzer configured to be coupled to a first gas flow line and configured to measure a first concentration of a target analyte in the gas received from the first gas flow line, the at least one gas analyzer configured to be coupled to a second gas flow line and configured to measure a second concentration of the target analyte in the gas received from the second gas flow line, a sample chamber configured to hold a water saturable sample or aqueous sample, and a filter component including a water vapor selective element and having a first input fluidly coupling the gas source to a first side of the water vapor selective element, a second input fluidly coupling an output of the sample chamber to a second side of the water vapor selective element, and at least one output fluidly coupling the first side of the water vapor selective element to the first gas flow line and to the second gas flow line and a second output coupling the second side of the water vapor selective element to the second gas flow line.

In another embodiment, a gas analysis system is provided that includes a gas source configured to provide a flow of a gas, at least one gas analyzer configured to be coupled to a first gas flow line and configured to measure a first concentration of a target analyte in the gas received from the first gas flow line, the at least one gas analyzer configured to be coupled to a second gas flow line and configured to measure a second concentration of the target analyte in the gas received from the second gas flow line, a sample chamber configured to hold a sample capable of generating and/or consuming a second analyte and the target analyte, and a filter component including a filter element and having a first input fluidly coupling the gas source to a first side of the filter element, a second input fluidly coupling an output of the sample chamber to a second side of the filter element, and at least one output fluidly coupling the first side of the filter element to the first gas flow line and to the second gas flow line and a second output coupling the second side of the filter element to the second gas flow line, wherein the filter element is configured to allow the second analyte to pass from the second side of the membrane to the first side of the membrane, and prevent passage of the target analyte from the second side of the membrane to the first side of the membrane. As used herein, generating an analyte may include outgassing, desorbing, a chemical reaction, a metabolic reaction, or other mechanisms for generating the analyte in question.

In certain aspects, a system further includes a flow swapping mechanism configured to alternate coupling of the at least one gas analyzer to the first gas flow line and to the second gas flow line, wherein the at least one gas analyzer measures the first concentration of the target analyte and the second concentration of the target analyte in a time-interleaved manner. In certain aspects, the at least one gas analyzer includes a first gas analyzer coupled to the first gas flow line and configured to measure the first concentration of the target analyte, and a second gas analyzer coupled to the second gas flow line and configured to measure the second concentration of the target analyte.

According to another embodiment, a method of measuring a concentration of a target analyte in a gas in a gas analysis system is provided. The method typically includes a) providing a flow of a gas from the gas source through the first portion of the filter component to the first gas flow line and to the second gas flow line, b) measuring a first concentration value of the target analyte in the gas in the first gas flow line using the at least one gas analyzer, c) measuring a second concentration value of the target analyte in the gas in the second gas flow line using the at least one gas analyzer; and d) determining a concentration of the target analyte in the gas based on the first and second concentration values, whereby a concentration of the second analyte in the gas in the first gas flow line measured by the at least one gas analyzer is substantially the same as a concentration of the second analyte in the gas in the second gas flow line measured by the at least one gas analyzer.

In certain aspects, a water vapor selective element includes a membrane element configured to allow substantially only water or water vapor to pass from the second side of the membrane to the first side of the membrane. For example, negligible amounts of other analytes may pass across the membrane. In certain aspects, the water vapor selective element includes a Nafion membrane. In certain aspects, a system further includes a control sub-system configured to control the at least one gas analyzer to take real-time gas measurements of the target analyte concentrations in the first and second gas flow lines. In certain aspects, the flow of the gas provided by the gas source includes a controlled water vapor concentration. In certain aspects, the target analyte includes $CO_2$, isotopes of $CO_2$, $CH_4$ or isotopes of $CH_4$, $O_2$ or isotopes of $O_2$. In certain aspects, a second analyte includes $H_2O$.

In certain aspects, a sample may include any material, substance or organism that exchanges, generates or consumes the target analyte. For example, the target analyte may include $CO_2$, isotopes of $CO_2$, $CH_4$ or isotopes of $CH_4$, $O_2$ or isotopes of $O_2$. In certain aspects, the sample may include a water saturable or aqueous sample, which may include a photosynthesis capable material, substance or organism, such as a leaf or algae, or may include a respiratory material, substance or organism, e.g., a material that respires, or may include a metabolically active material, substance or organism.

In a further embodiment, a non-transitory computer readable medium is provided that stores instructions, which when executed by one or more processors, cause the one or more processors to implement a method of measuring a concentration of a target analyte in a gas using a gas exchange measurement system as described herein.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWINGS

The detailed description is described with reference to the accompanying figures. The use of the same reference numbers in different instances in the description and the figures may indicate similar or identical items.

FIG. 6 shows an experimental set-up for confirming that $CO_2$ permeability of Nafion poses no significant errors in the measurement system.

FIG. 7 and FIG. 8 show the $CO_2$ and $H_2O$ concentrations on the high $CO_2$ side of the membrane as measured by a LI-COR LI-7815 $CO_2$/$H_2O$ Gas Analyzer.

FIG. 9 shows $CO_2$ as measured by the LI-COR LI-7000 $CO_2$/$H_2O$ Gas Analyzer B cell, which results from $CO_2$ permeating through the Nafion material.

DETAILED DESCRIPTION

The present disclosure provides systems and method for automatically reducing or minimizing the impact one analyte may have on measurement of another analyte in a differential measurement system. One example of a differential measurement system is a gas analysis system, such as a gas exchange measurement system as may be used for measuring plant leaf gas exchange based upon instantaneous mass balance in a leaf chamber of the gas exchange measurement system. In this context, an interferent analyte, e.g., $H_2O$, may have an adverse impact on measurements of another analyte, e.g., $CO_2$, if the difference in the interferent concentration, e.g., water vapor concentration, in a reference stream and a measurement stream becomes sufficiently large. The techniques of the present disclosure are applicable to any differential measurement system wherein one or more measurement devices, e.g., one or more sensors, measure the same physical property and determine a quantity of interest based on a difference between two (or more) absolute measurements where an interferent analyte may be present.

In an embodiment, an open flow through gas exchange system includes a water vapor differential minimizer (WVDM) filter component fluidly coupled with the sample chamber designed to allow aqueous samples, such as algal suspensions, or water saturable samples to be measured in the open flow through gas exchange system. The WVDM filter component can also be used for samples that are inherently wet or are maintained on a wet surface (e.g. saturated filter paper) to support the sample's viability. Certain embodiments will now be discussed in the context of a gas exchange analysis system; in particular, certain embodiments described herein in the functional description that follows are described in the context of the LI-COR Biosciences LI-6800 Photosynthesis System. However, it should be appreciated that embodiments may be used with any open gas exchange analysis system as the problems solved, as described herein, and their application are believed to be common to all open flow through gas exchange systems, because embodiments can effectively reduce or eliminate issues due to water cross sensitivity in downstream analysis, and alleviate the need for a precise water vapor dilution correction in downstream analysis.

Figure 1:
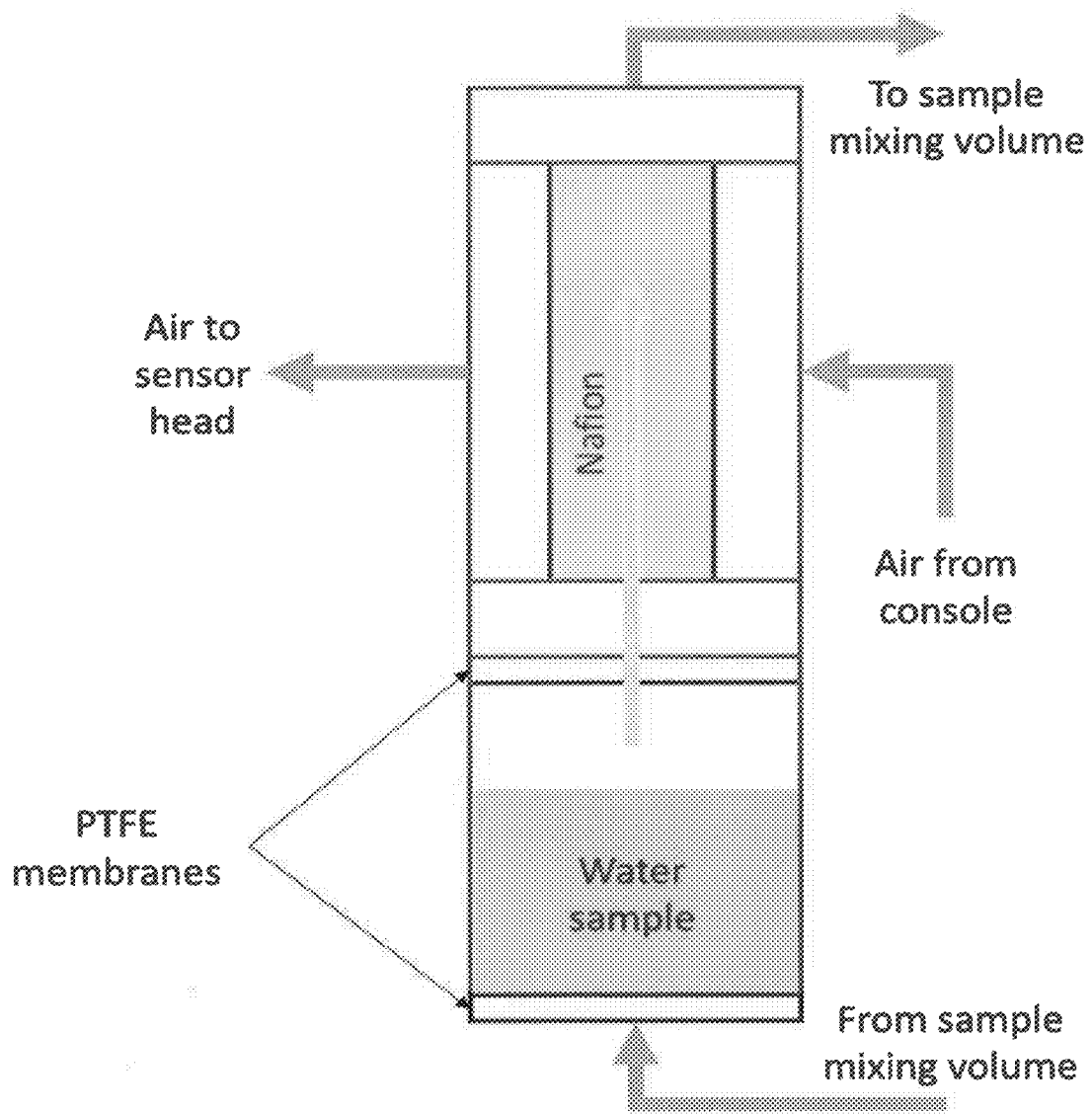
FIG. 1 illustrates a simplified flow and physical arrangement schematic including a water vapor differential minimizer component according to an embodiment.

FIG. 1 shows a simplified, conceptual system and flow diagram according to an embodiment. In an embodiment, with reference to the LI-6800 instrument as an example, the chamber containing the liquid sample sets in a parallel flow loop to the LI-6800's normal sample air flow path. Air is taken from a common mixing volume in the sample path, sent through the liquid sample and returned to the mixing volume. A PTFE membrane on either side of the liquid sample serves to separate liquid from the sample air stream and to diffuse the air entering the liquid sample. After crossing the membrane, water saturated air leaving the headspace above the liquid sample passes through the "wet side" of the WVDM filter component before being returned to the mixing volume. The "dry side" of the WVDM component receives the total flow coming from the LI-6800 console, before entering the LI-6800 sensor head. This flow represents the total system flow after passing through the water vapor control system in the LI-6800 console and before being separated into the reference and sample air streams. The wet and dry sides of the WVDM filter component are separated by a water vapor selective element or membrane (e.g., Nafion) that allows water vapor to pass through the membrane, but is substantially impermeable to other gases or analytes.

It should be appreciated that the analyte selective element or membrane, e.g., a water-vapor selective element or membrane, allows the interferent analyte (e.g., water in the case of Nafion) to pass bi-directionally through the element or membrane. Because the interferent analyte migrates bi-directionally, the interferent analyte trends toward equilibrium of partial pressures on either side of the element. Functionally, it may appear as if the interferent analyte is only moving in one direction; but rather, the rates are different in each direction such that the net effect appears uni-directional.

The water vapor concentration in the reference air stream represents the combined effects of water vapor exchange across the water vapor selective element or membrane (e.g., Nafion) and the water vapor control by the LI-6800 console. The exchange across the membrane is driven by a difference in water vapor concentration between the wetter and dryer sides, but a dry incoming air stream on the dryer side of the WVDM filter component is not needed. Only an air stream at a lower water vapor concentration than that of the air on the wet(ter) side is needed. In an embodiment, a water vapor control system, e.g., the water vapor control system in the LI-6800 console, may be used to manipulate the water vapor concentration in the total system flow. For example, the flow of the gas from the gas source may include a controllable water vapor concentration to control the water vapor concentration entering the dry(er) side to be lower than on the wet(ter) side. In this manner, in conjunction with the WVDM filter component, the air streams entering the sample and reference IRGAs can be controlled to have substantially the same $H_2O$ concentration. This allows measurements of carbon dioxide exchange to be made from the aqueous (or water saturable sample) with a zero or near zero water vapor differential.

Figure 2:
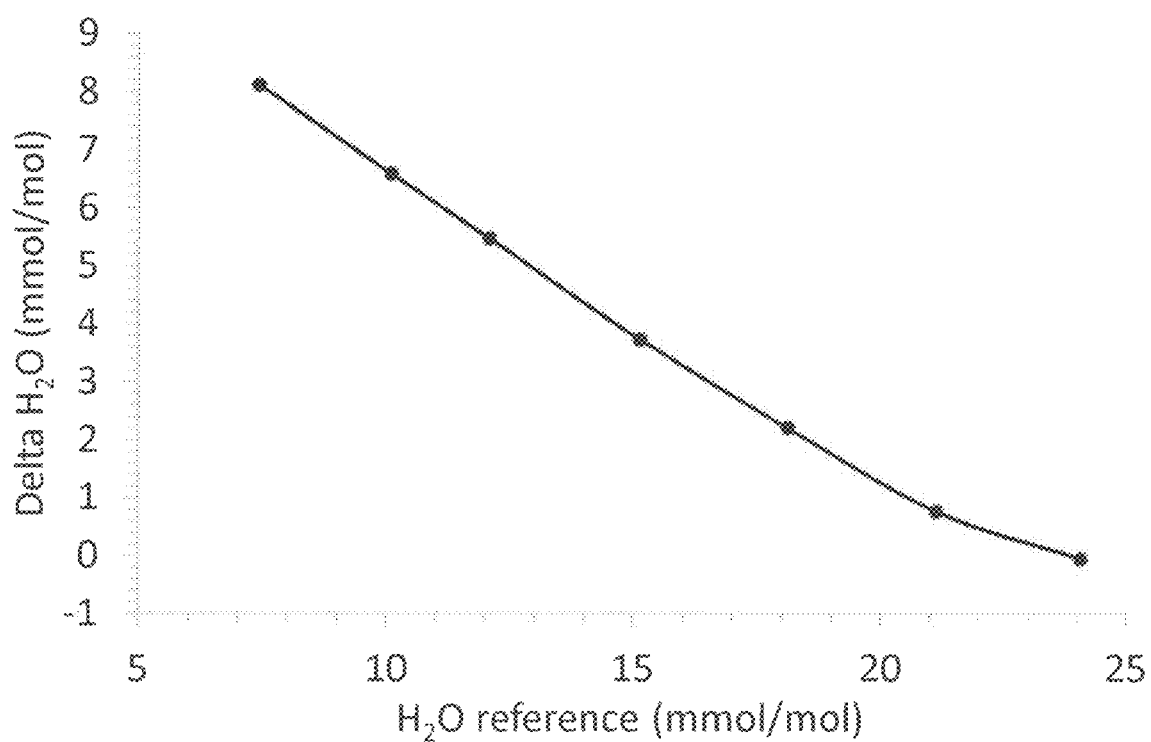
FIG. 2 illustrates water vapor differentials with 20 ml of liquid water in a prototypical sample chamber over a range of water vapor concentrations in the reference air stream using the water vapor differential minimizer component; reference water vapor concentrations were generated using active water vapor control by the LI-COR LI-6800 Photosynthesis System.

FIG. 2 illustrates water vapor differentials with 20 ml of liquid water in an liquid filled sample chamber over a range of water vapor concentrations in the reference air stream using the water vapor differential minimizer component; reference water vapor concentrations were generated using active water vapor control by the LI-6800 console. If dry air were supplied on one side of the WVDM component, the water vapor differential would not be zero. To achieve a zero differential, some non-zero $H_2O$ airstream is needed on the dryer side. By providing an appropriate non-zero $H_2O$ concentration the water vapor differential can be brought to zero.

Benefits of the present embodiments in the context of gas analysis systems include: (1) a reduction in the water vapor concentration of the sample air stream below the dew point, thereby reducing the potential for liquid condensation in downstream components, and (2) a reduction in the water vapor differential between the sample and reference air streams, thereby reducing the error in the absolute target analyte concentration measurements, and the corresponding differential.

While the embodiments disclosed herein related to water vapor serve in part a similar role to the multitude of Nafion gas driers and humidifiers reported elsewhere, the embodiments differ significantly in that a "dry" sample gas stream or a single conditioned gas stream for analysis is not the goal; rather, the embodiments serve to equilibrate two separate gas streams, both meant for analysis. As described above, such conditioning is partly to reduce or prevent potential condensation, partly to reduce or eliminate error sources associated with the cross sensitivity and nonlinearity of downstream analyte measurement devices (e.g. IRGAs), and partly to reduce or eliminate the potential error introduced by $H_2O$ dilution correction in downstream target analyte measurements. In contrast, prior gas driers, including those using Nafion, merely serve to condition a single gas stream for analysis with the purpose of either completely drying the gas stream before it enters an analyzer or humidifying the gas stream to minimize biological responses to dry air.

Figure 3:
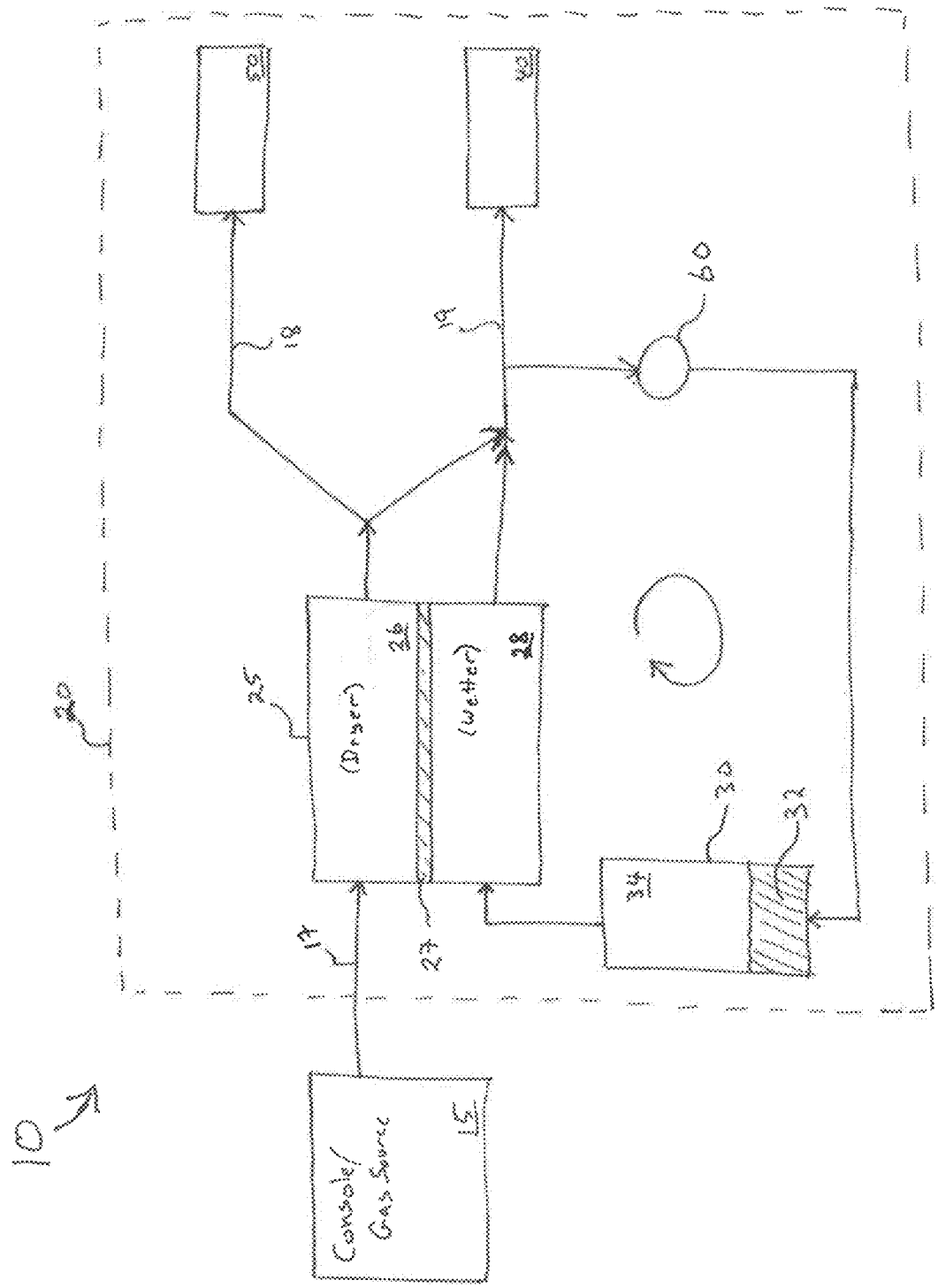
FIG. 3 illustrates an example of a gas exchange measurement system according to one embodiment.

FIG. 3 illustrates an example of a gas exchange measurement system 10 according to an embodiment. Gas exchange measurement system 10 in one embodiment includes a console 15 and a sensor head 20 remote from console 15. Other system embodiments may include an integrated console and sensor head or sensor module. Console 15 typically includes, or is connected with, one or more gas sources and gas conditioning equipment. For example, in the context of photosynthesis and transpiration measurements, gas sources could include reservoirs of $CO_2$ and $H_2O$, and conditioning equipment for controlling and conditioning each gas concentration in a gas flow line. A flow path or gas flow line 17 connecting console 15 with sensor head 20 typically includes flexible tubing and connectors. Flow path 17 provides a single stream or gas flow path to sensor head 20. A WVDM filter component (hereinafter filter component) 25 receives a stream of gas from console 15 at an input coupled to a dryer side 26 of a water vapor selective element 27. For example, the water vapor selective element may include a Nafion membrane. The Nafion membrane may be configured as a sheet or as a tubular structure, or it may take on any other configuration that enables definition of wet(ter) and dry(er) sides of the water vapor selective element 27 (as determined by the relative wetness of the two sides) or wet(ter) and dry(er) portions of a structure defining the filter component 25. As shown in the embodiment of FIG. 3, filter component 25 includes an enclosed structure having a first input fluidly coupling the gas source 15 (via flow line 17) to a portion (e.g., a volume) 26 on a first side of the water vapor selective element 27, a second input fluidly coupling an output in the headspace 34 of the sample chamber 30 to a portion (e.g., a volume) 28 on a second side of the water vapor selective element 27, and at least one output fluidly coupling the portion 26 to a first gas flow line 18 and to the second gas flow line 19, and a second output coupling portion 28 to the second gas flow line 19.

Filter component 25 acts as a conditioned source of gas; one stream is provided to the chamber 30 (e.g., sample mixing volume) via the second gas flow line 19 and the other stream (e.g., reference stream) is provided to a reference gas analyzer 50 via the first gas flow line 18. A second gas analyzer 40 receives and analyzes gas in the sample mixing volume via gas flow line 19. A recirculating pump 60 is provided, in some embodiments, to ensure sufficient pressure and flow rate for a recirculating flow in the sample mixing volume. As shown, the sample mixing volume may include the sample chamber 30, the second portion (volume) 28 of filter component 25, and the volume in the gas flow lines in the recirculating flow path coupling the sample chamber 30 and the second portion (volume) 28 of filter component 25. Reference gas analyzer 50 and second gas analyzer 40 might each include an Infra-Red Gas Analyzer (IRGA), a laser-based gas analyzer, or other gas analyzer as is known in the art.

Figure 4:
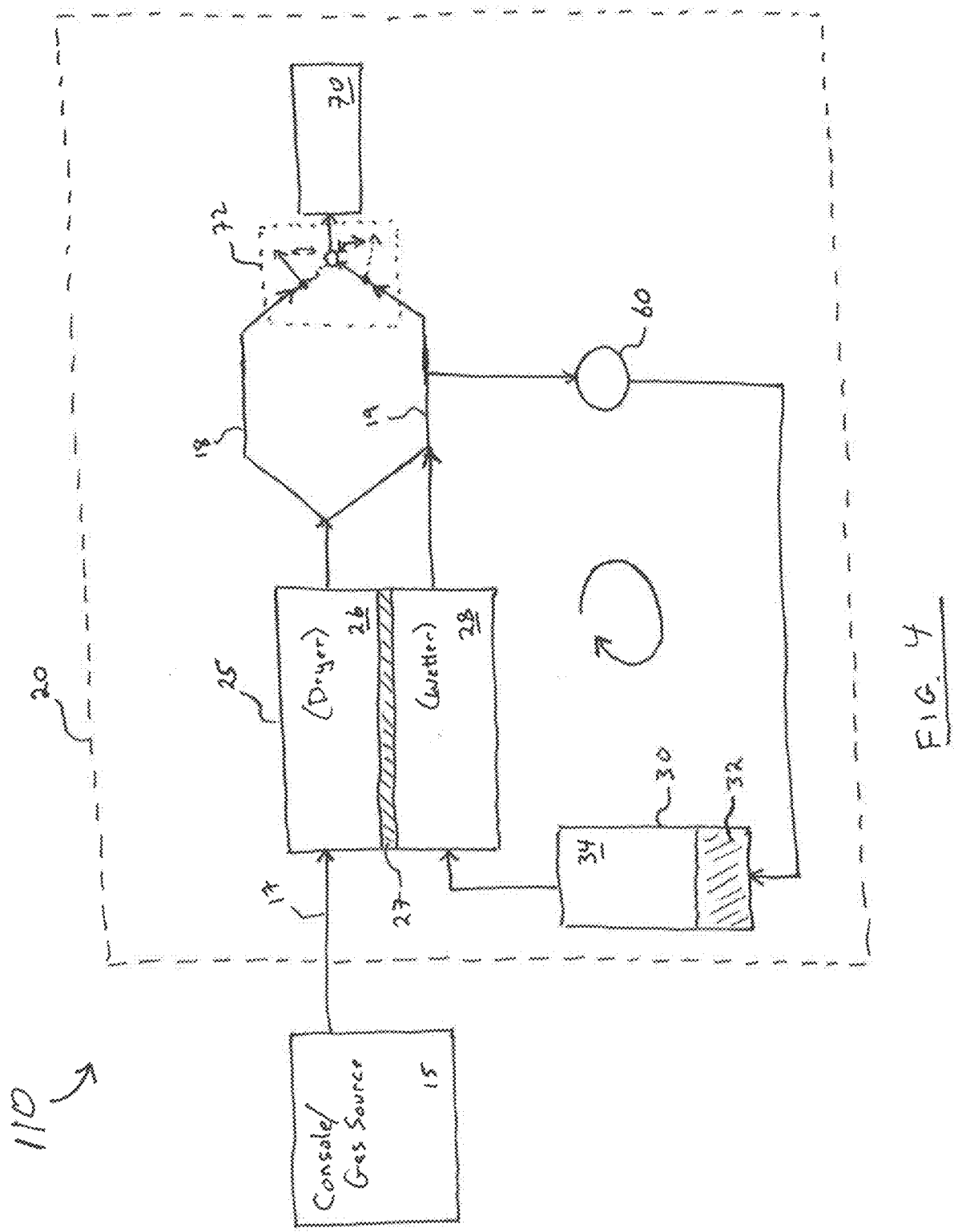
FIG. 4 illustrates another example of a gas exchange measurement system including a single gas analyzer operating in a time-interleaved manner, according to an embodiment.

FIG. 4 illustrates another example of a gas exchange measurement system 110 including a single gas analyzer, according to an embodiment. Most of the components of system 110 are similar or identical to components of system 10 and will not be described here. In system 110, gas analyzer 70 is configured to operate in an interleaved manner, e.g., gas analyzer 70 from either flow line 18 or flow line 19 in a time-interleaved manner. For example, a flow swapping component 72 may be connected to flow line 18 and flow line 19 and operate to switch the flow provided to gas analyzer 70 in a controlled manner. The flow swapping component 72, in an embodiment, includes first and second inlets and an output port and is configured to receive a first fluid flow at the first inlet and a second fluid flow at the second inlet and in a first operational mode to direct the first fluid flow to the output port, and in a second operational mode to direct the second fluid flow to the output port. An input of gas analyzer 70 is coupled to the output of flow swapping component 72. The flow swapping component 72 may include one or a plurality of active valve elements, including valves with active valve actuators, arranged in a manner that facilitates provisioning of the gas flows received from the inlets to the output in a controlled manner. "Active" devices or components include those that can be controlled electronically by a computer, controller, or other machine. Active devices or components often can be adjusted in real-time automatically without intervention by a human operator. In certain embodiments, the active valve elements include piezoelectric or piezo-resistive (hereinafter also termed "piezo") elements.

In operation, gas analyzer 70 operates in a time-interleaved manner to interchangeably sample air from flow line 18 and from flow line 19, thereby acting as both the reference analyzer and sample analyzer.

Figure 5:
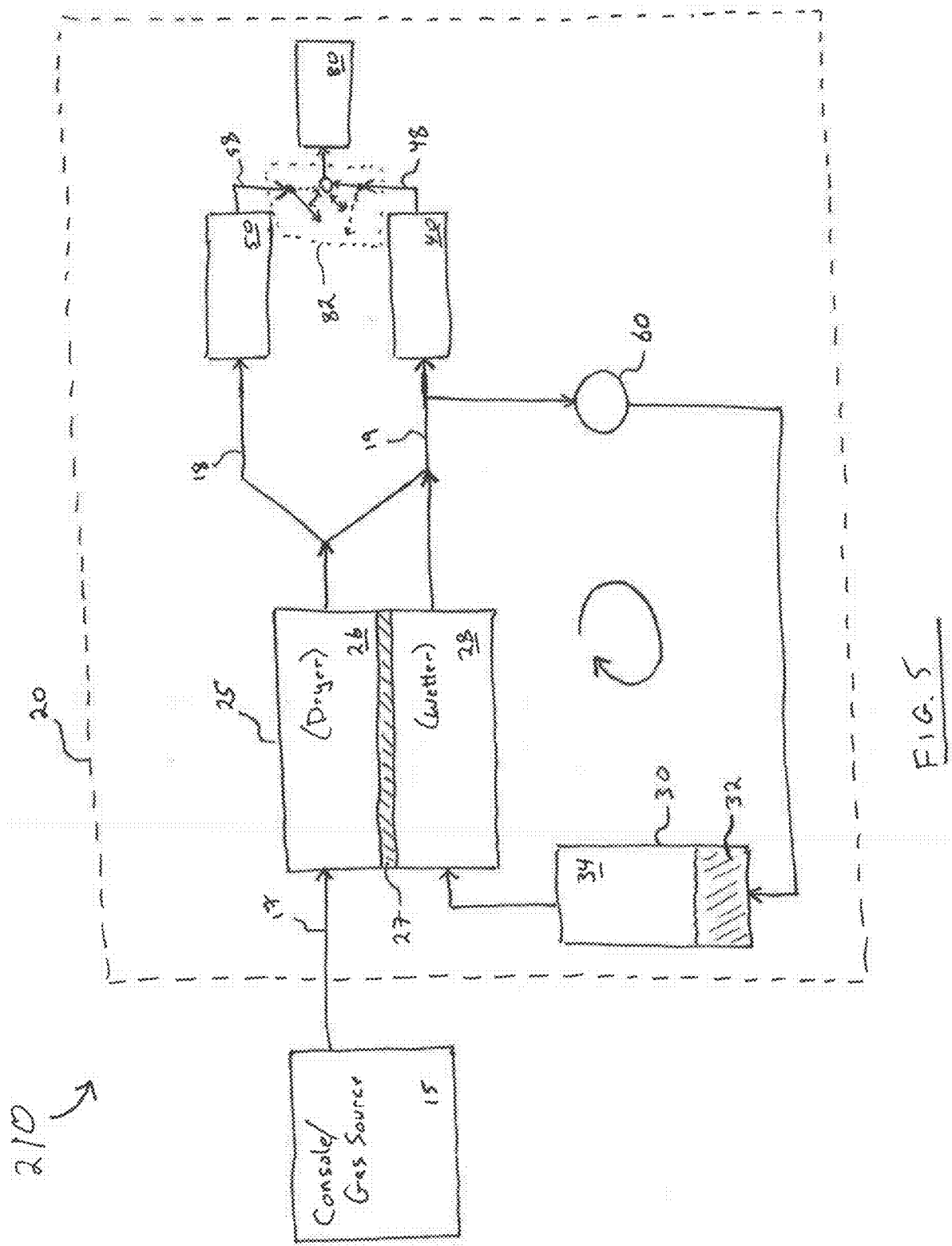
FIG. 5 illustrates another example of a gas exchange measurement system including an additional gas analyzer, according to an embodiment.

FIG. 5 illustrates another example of a gas exchange measurement system 210 including an additional gas analyzer, according to an embodiment. Most of the components of system 210 are similar or identical to components of system 10 and will not be described here. In system 210, gas analyzer 80 is configured to receive a flow output from gas analyzer 50 and a flow from gas analyzer 40 in an interleaved manner, e.g., gas analyzer 80 samples from either flow line 58 or flow line 48 in a time-interleaved manner. For example, a flow swapping component 82 may be connected to flow line 58 and flow line 48 and operate to switch the flow provided to gas analyzer 80 in a controlled manner. Flow swapping component 82 may be similar in construction and functionality to flow swapping component 72 described above and will not be described in further detail. System 210 advantageously allows measurement of a greater variety of analyte species than is possible with a single type of gas analyzer.

In certain embodiments, a control system (not shown), e.g., including one or more processors and associated memory, may be provided to control various system components, e.g., to control the flow of gas in system 10, 110 or 210. For example, the control system may control the amount or concentration of a gas and/or an analyte (e.g., water vapor concentration) in the gas provided from the console 15 and the control system may control operation of recycle pump 60. In an embodiment, the control system controls operation of the gas analyzers (e.g., gas analyzer 40, gas analyzer 50, gas analyzer 70, and gas analyzer 80), and flow swapping components, when present, e.g., to take real-time concentration measurements of a target analyte in the gas flow lines. The target analyte might include $CO_2$, isotopes of $CO_2$, $CH_4$, isotopes of $CH_4$ $O_2$ or isotopes of $O_2$, or other analyte of interest.

In certain embodiments, the control system or other intelligence module, which may include a processing component or components such as one or more processors and associated memory and/or storage, is configured to control, and to receive and process data from, the measurement devices to implement the methods disclosed herein, e.g., real-time concentration measurements of a target analyte.

Each processor or processing component is configured to implement functionality and/or process instructions for execution, for example, instructions stored in memory or instructions stored on storage devices, and may be implemented as an ASIC including an integrated instruction set. A memory, which may be a non-transient computer-readable storage medium, is configured to store information during operation. In some embodiments, a memory includes a temporary memory, area for information not to be maintained when the processing component is turned OFF. Examples of such temporary memory include volatile memories such as random access memories (RAM), dynamic random access memories (DRAM), and static random access memories (SRAM). The memory maintains program instructions for execution by the processing component.

Storage devices also include one or more non-transient computer-readable storage media. Storage devices are generally configured to store larger amounts of information than the memory. Storage devices may further be configured for long-term storage of information. In some examples, storage devices include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

An experiment was conducted to confirm that Nafion permeability to $CO_2$ does not cause measurable impact on measurements for various embodiments herein. The experiment included measuring $CO_2$ transport across a Nafion membrane under an extreme $\Delta CO_2$ across the membrane. FIG. 6 shows the experimental set-up. All plumbing involving the low $CO_2$ side of the membrane (Compartment A) was ⅛" copper tubing to minimize diffusion and bulk flow leaks. Flow rates were set to ~1 LPM using rotometers. The LI-COR Biosciences LI-7000 $CO_2$ analyzer was configured to measure the concentration of Cell B relative to Cell A, with Cell A set to 0 $\mu mol\ mol^{-1}$. Before the experiment began, the Ultra-Pure zero tank (0% $CO_2$) tank was run directly to cells A and B and cell B matched to cell A. The experiment consisted of 30 minutes of high $CO_2$ (19000 $\mu mol\ mol^{-1}$) into Compartment B, followed by 30 minutes of zero gas (0 $\mu mol\ mol^{-1}$ $CO_2$) and returning to high $CO_2$ for 30 minutes. Throughout the experiment, this tank air was humidified by running air though an LI-COR LI-6800 humidification column. Humidification was necessary as $CO_2$ permeability through Nafion is strongly related to the wetness of the Nafion.

FIG. 7 and FIG. 8 show the $CO_2$ and $H_2O$ concentrations on the high $CO_2$ side of the membrane as measured by a LI-COR Biosciences LI-7815 $CO_2$ analyzer. The slight changes in $H_2O$ when switching between tanks are likely due to differences in flow rate, as rotometers were manually adjusted to ~1 LPM in each case. FIG. 9 shows $CO_2$ as measured by the LI-7000 B cell, which results from $CO_2$ permeating through the Nafion material. Room temperature was ~21° C. and relative humidity in the test-setup is approximately 65% during the 1st high $CO_2$ period and 60% during the 2nd using the $H_2O$ data from the LI-COR LI-7815 $CO_2/H_2O$ gas analyzer. With the humidified air-stream, a $\Delta CO_2$ of ~19000 $\mu mol\ mol^{-1}$ across the membrane led to a worst-case measurement of 0.7 $\mu mol\ mol^{-1}$ on the low $CO_2$ side of the membrane, or ~3.7E-5 $\mu mol\ mol^{-1} \Delta\ CO_2^{-1}$. At typical operating $\Delta CO_2$ when measuring algal suspensions in approximately 20 mL of liquid water in a prototype sample chamber is <10 $\mu mol\ mol^{-1}$, this is approximately three orders of magnitude lower than the LI-6800 IRGA limit of detection. Accordingly, $CO_2$ permeability of Nafion poses no measurable errors.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A gas analysis system, the system comprising:
   a gas source configured to provide a flow of a gas;
   at least one gas analyzer configured to be coupled to a first gas flow line and configured to measure a first concentration of a target analyte in the gas received from the first gas flow line, the at least one gas analyzer configured to be coupled to a second gas flow line and configured to measure a second concentration of the target analyte in the gas received from the second gas flow line;
   a sample chamber configured to hold a water saturable sample or aqueous sample; and
   a filter component including a water vapor selective element and having a first input fluidly coupling the gas source to a first side of the water vapor selective element, a second input fluidly coupling an output of the sample chamber to a second side of the water vapor selective element, and at least one output fluidly coupling the first side of the water vapor selective element to the first gas flow line and to the second gas flow line and a second output coupling the second side of the water vapor selective element to the second gas flow line.

2. The system of claim 1, wherein the water vapor selective element includes a membrane element configured to allow substantially only water or water vapor to pass from the second side of the membrane to the first side of the membrane.

3. The system of claim 1, wherein the water vapor selective element includes a Nafion membrane.

4. The system of claim 1, further including a control sub-system configured to control the at least one gas analyzer to take real-time gas measurements of the target analyte concentrations in the first and second gas flow lines.

5. The system of claim 1, wherein the flow of the gas provided by the gas source includes a controlled water vapor concentration.

6. The system of claim 1, further including a flow swapping mechanism configured to alternate coupling of the at least one gas analyzer to the first gas flow line and to the second gas flow line, wherein the at least one gas analyzer measures the first concentration of the target analyte and the second concentration of the target analyte in a time-interleaved manner.

7. The system of claim 1, wherein the at least one gas analyzer includes a first gas analyzer coupled to the first gas flow line and configured to measure the first concentration of the target analyte, and a second gas analyzer coupled to the second gas flow line and configured to measure the second concentration of the target analyte.

8. The system of claim 1, wherein the water saturable sample or aqueous sample includes a photosynthesis capable material, substance or organism, or a respiratory material, substance or organism, or a metabolically active material, substance or organism.

9. The system of claim 1, wherein the output of the sample chamber is coupled to a headspace of an enclosed sample chamber volume of the sample chamber.

10. The system of claim 1, further including a recycle pump configured to pump air from the second gas flow line to a sample containing region of the sample chamber.

11. A method of measuring a concentration of a target analyte in a gas in a gas analysis system having at least one gas analyzer, a sample chamber configured to hold a water saturable sample or aqueous sample, and a filter component including a water vapor selective element that separates a first portion of the filter component from a second portion of the filter component and that is configured to allow substantially only water or water vapor to pass across the element from the second portion to the first portion, the filter component further including a first input fluidly coupling a gas source to the first portion of the filter component, a second input fluidly coupling an output of the sample chamber to the second portion of the filter component, and at least one output fluidly coupling the first portion of the filter component to a first gas flow line and to a second gas flow line and a second output coupling the second portion of the filter component to the second gas flow line, wherein the second gas flow line is fluidly coupled with the sample chamber, the method comprising:
   a) providing a flow of a gas from the gas source through the first portion of the filter component to the first gas flow line and to the second gas flow line;
   b) measuring a first concentration value of the target analyte in the gas in the first gas flow line using the at least one gas analyzer;
   c) measuring a second concentration value of the target analyte in the gas in the second gas flow line using the at least one gas analyzer; and
   d) determining a concentration of the target analyte in the gas based on the first and second concentration values, whereby a water vapor concentration of the gas in the first gas flow line measured by the at least one gas analyzer is substantially the same as a water vapor concentration of the gas in the second gas flow line measured by the at least one gas analyzer.

12. The method of claim 11, wherein the water saturable sample or aqueous sample includes a photosynthesis capable material, substance or organism, or a respiratory material, substance or organism, or a metabolically active material, substance or organism.

13. The method of claim 11, wherein the water vapor selective membrane includes a Nafion membrane.

14. The method of claim 11, wherein the flow of the gas from the gas source includes a controlled water vapor concentration.

15. The method of claim 11, wherein the target analyte includes $CO_2$, isotopes of $CO_2$, $CH_4$ or isotopes of $CH_4$, $O_2$ or isotopes of $O_2$.

16. The method of claim 11, wherein the output of the sample chamber is coupled to a headspace of an enclosed sample chamber volume of the sample chamber.

17. The method of claim 11, further including recycling air from the second gas flow line to a sample containing region of the sample chamber using a recycle pump.

18. The method of claim 11, wherein the at least one gas analyzer measures the first concentration value of the target analyte and the second concentration value of the target analyte in a time-interleaved manner.

19. A gas analysis system, the system comprising:
a gas source configured to provide a flow of a gas;
at least one gas analyzer configured to be coupled to a first gas flow line and configured to measure a first concentration of a target analyte in the gas received from the first gas flow line, the at least one gas analyzer configured to be coupled to a second gas flow line and configured to measure a second concentration of the target analyte in the gas received from the second gas flow line;
a sample chamber configured to hold a sample capable of generating a second analyte and the target analyte; and
a filter component including a filter element and having a first input fluidly coupling the gas source to a first side of the filter element, a second input fluidly coupling an output of the sample chamber to a second side of the filter element, and at least one output fluidly coupling the first side of the filter element to the first gas flow line and to the second gas flow line and a second output coupling the second side of the filter element to the second gas flow line,
wherein the filter element is configured to allow the second analyte to pass from the second side of the membrane to the first side of the membrane, and prevent passage of the target analyte from the second side of the membrane to the first side of the membrane.

20. The system of claim 19, wherein the target analyte includes $CO_2$, isotopes of $CO_2$, $CH_4$ or isotopes of $CH_4$, $O_2$ or isotopes of $O_2$, and the second analyte comprises $H_2O$.

21. The system of claim 20, wherein the filter element includes a water vapor selective membrane configured to allow substantially only water or water vapor to pass from the second side of the membrane to the first side of the membrane.

22. The system of claim 21, wherein the water vapor selective membrane includes a Nafion membrane.

* * * * *